United States Patent [19]

Noonan et al.

[11] 4,395,475

[45] Jul. 26, 1983

[54] CONDENSATION POLYMERIC PHOTOCONDUCTORS CONTAINING PENDANT ARYLAMINES

[75] Inventors: John M. Noonan; Jerome H. Perlstein, both of Rochester, N.Y.

[73] Assignee: Eastman Kodak Company, Rochester, N.Y.

[21] Appl. No.: 285,235

[22] Filed: Jul. 20, 1981

[51] Int. Cl.$^3$ .............................................. G03G 5/07
[52] U.S. Cl. ..................................... 430/69; 430/73; 430/97
[58] Field of Search ............................. 430/73, 97, 69

[56] References Cited

U.S. PATENT DOCUMENTS 3,471,625 10/1969 Adams et al.
3,704,122 11/1972 Yamaguchi et al.
3,779,750 12/1973 Merrill et al.
4,025,341 5/1977 Rule.
4,092,162 5/1978 Wright et al.

OTHER PUBLICATIONS

U.S. Pat. application Ser. No. 256,338, filed 7-23-81, Isaacson et al.

*Primary Examiner*—John D. Smith
*Attorney, Agent, or Firm*—Torger N. Dahl

[57] ABSTRACT

Polymeric photoconductors are disclosed comprising a condensation polymer backbone containing, as repeating units, the condensation residues of (1) a diacid, and (2) an organic difunctional compound capable of undergoing condensation polymerization with said diacid, and an arylamine photoconductor group appended to at least one of said diacid or said organic difunctional compound residues.

A preferred polymeric photoconductor is ionic and comprises a condensation copolymer containing, in addition to the above described repeating units, the condensation residue of a second diacid containing an anionic iminodisulfonyl or sulfo group. In certain embodiments, the ionic arylamine-containing polymers are water-dispersible copolyesters.

The polymeric photoconductors described are useful in photoconductive compositions and elements. Electrophotographic processes employing such elements are also disclosed.

13 Claims, No Drawings

CONDENSATION POLYMERIC PHOTOCONDUCTORS CONTAINING PENDANT ARYLAMINES

FIELD OF THE INVENTION

This invention relates to photoconductive condensation polymers containing arylamine moieties pendant from the polymer backbone, and to photoconductive compositions, elements and electrophotographic processes employing such polymers.

The process of xerography, as disclosed by Carlson in U.S. Pat. No. 2,297,691, employs an electrophotographic element comprising a support material bearing a coating of an insulating material whose electrical resistance varies with the amount of incident electromagnetic radiation it receives during an imagewise exposure. The element, commonly termed a photoconductive element, is first given a uniform surface charge in the dark after a suitable period of dark adaptation. It is then exposed to a pattern of actinic radiation which has the effect of differentially reducing the potential of this surface charge in accordance with the relative energy contained in various parts of the radiation pattern. The differential surface charge, or electrostatic latent image, remaining on the electrophotographic element is then developed by contacting the surface with a suitable electroscopic marking material. Such marking material, or toner, whether contained in an insulating liquid or in a dry developer, is deposited on the exposed surface in accordance with either the charge pattern or discharge pattern depending on the charge polarity of the toner and the surface of the element. Deposited marking material is either permanently fixed to the surface of the sensitive element by means such as heat, pressure, or solvent vapor, or transferred to a second element to which it is similarly fixed. Likewise, the electrostatic charge pattern can be transferred to a second element and developed there.

Various photoconductive insulating materials have been employed in the manufacture of electrophotographic elements. For example, selenium and selenium alloys deposited on a suitable support and particles of photoconductive zinc oxide held in a resinous, film-forming binder have found wide application in present-day, document-copying processes.

Since the introduction of electrophotography, a great many organic compounds, both monomers and polymers, have been evaluated for their photoconductive properties. As a result, a large number of organic compounds are known to possess some degree of photoconductivity. Many of the organic compounds exhibit useful levels of photoconduction and have been incorporated into photoconductive compositions. Included among the known organic photoconductive materials are triarylamine polymeric photoconductors as disclosed in U.S. Pat. Nos. 4,025,341 (issued May 27, 1977 to N. G. Rule) 4,092,162 (issued May 30, 1978 to H. E. Wright et al) and 3,779,750 (issued Dec. 18, 1973 to S. H. Merrill et al). In these polymers, the triarylamine groups are divalently included directly in the polymer backbone.

It is also known that photoconductive compositions can be made water-dispersible by combining a photoconductor with an ionizable material. U.S. Pat. No. 3,471,625 (issued Oct. 7, 1969 to D. N. Adams et al), for example, discloses a two-component water-dispersible photoconductive composition comprising a photoconductor and a film-forming addition polymer having ester, hydroxyl or carboxyl groups to render the polymer water soluble at an alkaline pH.

There are problems, however, associated with the use of prior art ionizable materials in photoconductor compositions. For example, in the initial step of a copy process wherein a photoconductive composition is given a uniform charge, the ionizable material often interacts undesirably with the imposed charge. Either the photoconductor cannot be charged to a sufficiently high level to be useful, or the charge dissipates excessively in the dark from the photoconductor surface as disclosed in U.S. Pat. No. 3,704,122 (issued Nov. 28, 1971 to N. Yamaguch, et al). Furthermore, although the use of ionizable materials in photoconductive compositions can provide water solubility or dispersibility, such materials do so in many instances at the sacrifice of solubility of the composition in organic solvents, as reported in U.S. Pat. No. 3,471,625 cited above. Accordingly, the successful use of ionizable materials is unpredictable and has been limited to the use of specific classes of polymers and separate photoconductors as set forth in U.S. Pat. Nos. 3,704,122 and 3,471,625. Neither of these patents teach or suggest that ionizable polymers may also contain photoconductive groups.

In accord with the present invention, polymeric photoconductors are provided comprising condensation polymers containing, as repeating units, the condensation residues of:

(a) a diacid, and (b) an organic difunctional compound capable of undergoing condensation polymerization with said diacid, wherein at least one of said residues contains an appended arylamine photoconductor group.

In accord with the present invention, the condensation polymers are optionally ionic and in such an embodiment contain, as repeating units, the condensation residues of:

(a) a first diacid, (b) a second diacid containing an anionic iminodisulfonyl or sulfo group, and (c) at least one organic difunctional compound capable of undergoing condensation polymerization with said first and second diacids, wherein at least one of said first diacid and organic difunctional compound residues contains said appended arylamine photoconductor group.

Further embodiments of the present invention include photoconductive compositions comprising the defined photoconductors. The spectral response of these compositions can be modified through the use of spectral sensitizing dyes such as pyrylium dyes. Photoconductive compositions of the present invention are particularly useful in photoconductive elements composed of a layer of the composition on an electrically conducting support.

The present arylamine-containing polymers exhibit exceptionally high degrees of photoconductivity. In some instances, moreover, high degrees of photoconductivity are provided without the presence of sensitizers.

Preferred ionic polymeric photoconductors of the present invention exhibit particularly advantageous properties, yet the ionic iminodisulfonyl or sulfo groups do not inhibit the ability of the polymer to otherwise function as a photoconductor. That is, the ionic photoconductive polymer readily accepts in the dark and retains useful levels of electrostatic charge, and readily dissipates such charge upon exposure to actinic radiation energy. Furthermore, the present ionic polymers are readily rendered water-dispersible without sacrificing the dispersibility of the polymers in non-aqueous solvents. These ionic polymers, morever, when formulated into a photoconductive layer in an element, are capable of excellent image resolution.

Polymeric photoconductors of the present invention are represented by the structural formula:

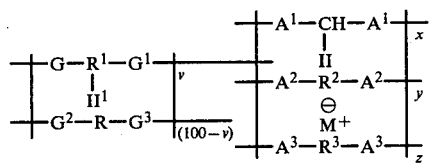

wherein $\pi$ and $\pi^1$, which are the same or different, are organic groups containing an arylamine which confers photoconductivity upon polymer I; $R^1$-$\pi^1$ together with G and $G^1$ represents an organic condensation residue of a difunctional compound capable of undergoing condensation with organic diacids; R together with $G^2$ and $G^3$ represents the organic condensation residue of at least one difunctional compound capable of undergoing condensation with organic diacids; G and $G^1$, which are the same or different, and $G^2$ and $G^3$, which are the same or different, represent -O- or -NH-; $A^1$, $A^2$ and $A^3$, which are the same or different, represent the residue of acid groups such as

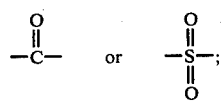

$R^{2\ominus}$ is an organic group which contains an anionic iminodisulfonyl or sulfo group; $M^+$ is a cation such as ionic sodium, lithium, ammonium, phosphonium, potassium or hydrogen; -$A^3$-$R^3$-$A^3$- represents an organic diacid condensation residue; x is 0 to 100 mole percent of the total diacid content; y is 0 to about 35 mole percent of the total diacid content, and z is 0 to 100 mole percent of the total diacid content; the sum of x, y and z is 100; v is 0 to 100 mole percent of the total difunctional compound content; and v+x is at least 20.

As indicated by formula I, $\pi$ and $\pi^1$ represent organic groups containing a monovalently appended arylamine photoconductor. Representative examples of $\pi$ and $\pi^1$ include alkylenearylamine monovalently appended groups corresponding to the structure:

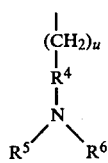

wherein u is an integer from 1 to 6, preferably 1, and $R^5$ and $R^6$ are the same or different and represent alkyl, cycloalkyl, aryl or aralkyl and $R^4$ represents alkylene, cycloalkylene, arylene or arylenealkylene, with the proviso that at least one of $R^4$, $R^5$ and $R^6$ comprises an aromatic group appended to the nitrogen atom. Preferred aryl and arylene groups include phenyl, tolyl, phenylene and tolylene. Preferably, $R^4$, $R^5$ and $R^6$ are each aromatic.

In those instances when the arylamine photoconductor group is provided by repeating units of a difunctional compound capable of undergoing condensation with organic diacids, the polymeric photoconductors of the present invention comprise one or more recurring units containing $R^1$-$\pi^1$ in structure I above. $R^1$-$\pi^1$ together with G and $G^1$ represents the arylamine-containing condensation residue of an organic difunctional compound remaining after condensation with an organic diacid or functional equivalent of a diacid. $R^1$ is generally, therefore, a $\pi^1$-substituted organic radical having from about 2 to 40 carbon atoms, including optional non-carbon atoms. Exemplary $R^1$ radicals include $\pi^1$-substituted hydrocarbon radicals, such as straight and branched chain alkylene radicals (e.g., ethylene, trimethylene, 2,2-dimethyl-1,3-propylene, etc.), cycloalkylene radicals (e.g., cyclohexylene, cycloheptylene, etc.), and arylene radicals (e.g., phenylene); and hydrocarbon-oxy-hydrocarbon radicals, such as alkylene-oxy-alkylene and alkylene-oxy-cycloalkylene-oxy-alkylene.

Polymers according to Structure I also can contain the recurring unit

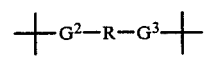

the condensation residue of at least one difunctional compound capable of undergoing condensation with organic diacids. R is generally, therefore, an organic radical having from about 2 to 40 carbon atoms, including optional non-carbon atoms. Exemplary radicals include hydrocarbon radicals, such as straight and branched chain alkylene radicals (e.g., ethylene, trimethylene, 2,2-dimethyl-1,3-propylene, etc.), cycloalkylene radicals (e.g., cyclohexylene, cycloheptylene, etc.), and arylene radicals (e.g., phenylene); and hydrocarbon-oxy-hydrocarbon radicals, such as alkylene-oxy-alkylene and alkylene-oxy-cycloalkylene-oxy-alkylene.

Representative $R^2$ groups containing the anionic iminodisulfonyl group

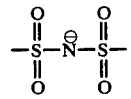

or the anionic sulfo group

include one or more groups corresponding to the following structures:

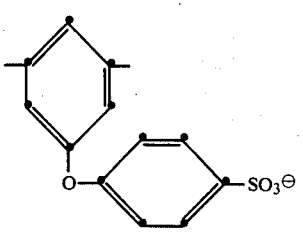

II

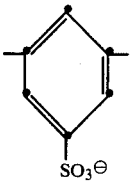

III

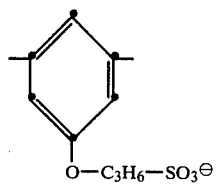

IV

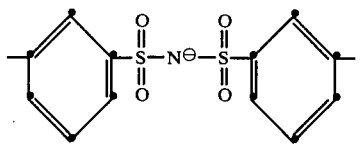

V

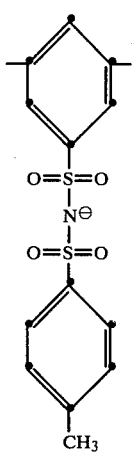

VI

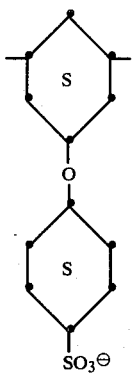

VII

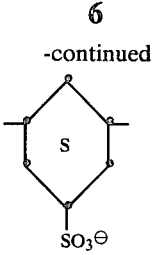

-continued

VIII

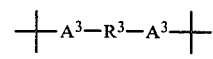

Polymeric photoconductors defined herein comprise, when desired, additional repeating units for any desired purpose such as varying solubility, charge control, compatibility with other components, adhesion, and toughness. Accordingly, the present polymers include optional repeating units represented, for example, by $$\left[\!\!-\!A^3\!\!-\!R^3\!\!-\!A^3\!\!-\!\right]$$

in formula I which signifies one or more organic diacid condensation residues. Accordingly, representative $R^3$ groups include unsubstituted and substituted alkylene, arylene, arylenealkylene, cycloalkylene, heterocyclic groups and ethylenically unsaturated groups.

In a preferred embodiment of the present invention, polyester photoconductors are provided comprising condensation polymers containing, as repeating units, the condensation residues of:

(a) a dicarboxylic acid, and (b) an organic diol capable of undergoing condensation polymerization with said dicarboxylic acid, wherein at least one of said residues contains an appended arylamine photoconductor group.

In the preferred embodiment, the arylamine-containing polyesters are optionally ionic and contain in this embodiment, as repeating units, the condensation residues of:

(a) a first dicarboxylic acid, (b) a second dicarboxylic acid containing an anionic iminodisulfonyl or sulfo group, and (c) at least one organic diol capable of undergoing condensation polymerization with said first and second dicarboxylic acids, wherein at least one of said first dicarboxylic acid and organic diol residues contains an appended arylamine photoconductor group.

Polyester photoconductors of the present invention are accordingly represented by the structural formula:

IX

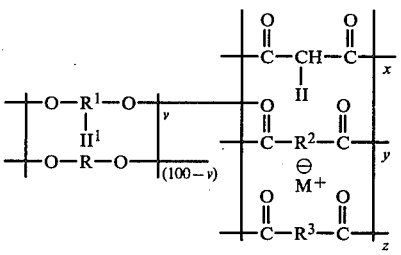

wherein R, $R^1$, $R^2$, $R^3$, $M^+$, $\pi,\pi^1$, x, y, z and v are as defined with respect to structure I above.

In the preferred polyesters according to the present invention, the second dicarboxylic acid units, designated in structure IX as,

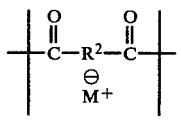

can comprise residues of various conventional dicarboxylic acids such as phthalic acids, isophthalic acids, terephthalic acids and cyclohexanedicarboxylic acids. Bis-benzoic acids comprising benzoic acid moieties linked symmetrically about other groups such as iminodisulfonyl anionic groups are also advantageously employed. In each instance, of course, the repeating unit contains an anionic iminodisulfonyl or sulfo group and the M+ counterion.

Exemplary preferred dicarboxylic acids having an anionic iminodisulfonyl group include 3,3'-[sodioimino)disulfonyl]dibenzoic acid; 3,3'-[(potassioimino)disulfonyl]dibenzoic acid; 3,3'-[(lithioimino)disulfonyl]-dibenzoic acid; 4,4'-[(lithioimino)disulfonyl]dibenzoic acid; 4,4'-[(sodioimino)disulfonyl]dibenzoic acid; 4,4'-[(potassioimino)disulfonyl]dibenzoic acid; 3,4'-[(lithioimino)disulfonyl]dibenzoic acid; 3,4'-[(sodioimino)disulfonyl]dibenzoic acid; 4,4'-[(potassiomino)disulfonyl]dinaphthoic acid; 5-[N-potassio-N-(4-tolylsulfonyl)sulfamoyl]isophthalic acid and functional derivatives thereof. These and other dicarboxylic acids are disclosed in U.S. Pat. No. 3,546,180 of Caldwell et al issued Dec. 8, 1970, and U.S. Pat. No. 3,929,489 of Arcesi et al issued Dec. 30, 1975, the disclosures of which are incorporated herein by reference.

Preferred dicarboxylic acids having an anionic sulfo group include 5-sodiosulfoisophthalic acid, 5-(4-sodiosulfophenoxy)isophthalic acid, 5-(3-sodiosulfopropoxy)isophthalic acid, 5-sodiosulfo-1,3-cyclohexanedicarboxylic acid and 5-(4-sodiosulfocyclohexyloxy)-1,3-cyclohexanedicarboxylic acid and functionally equivalent derivatives thereof.

Considering all components, in a preferred photoconductive polyester according to formula IX above, $\pi$ contains triphenylamine or di-p-tolylphenylamine,

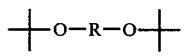

is derived from an organic diol selected from the group consisting of alkylenediol, di(hydroxyalkyl)cyclohexane and di(hydroxyalkoxy)cyclohexane;

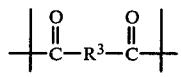

is derived from an aromatic dicarboxylic acid such as phthalic acid, isophthalic acid or terephthalic acid; and

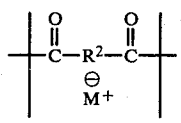

comprises either an anionic iminodisulfonyl or anionic sulfo group linked to the residue of an organic dicarboxylic acid selected from the group consisting of phthalic acids, isophthalic acids, terephthalic acids, bis(benzoic acids) or cyclohexanedicarboxylic acids; and x is from about 20 to about 65 mole percent, z is 0 to about 70 mole percent, y is from about 10 to about 35 mole percent, and v is 0.

Polymers pursuant to the present invention are readily dispersible in common solvents such as dichloroethane. In certain of the preferred polyesters water-dispersibility is provided by employing a molar percentage (y in polyester IX) of the ionic diacid repeating unit that is sufficient to confer water-dispersibility on polyester IX. In this regard, water-dispersibility signifies that the resulting polyester will form a stable aqueous composition comprising a dispersion or solution containing at least 3 weight percent of the polyester for at least two months, usually six months or more, with essentially no visible signs of agglomeration or crystallization. Preferred water-dispersible photoconductive polyesters of the present invention that form such aqueous compositions correspond to structure IX wherein y is from about 10 to about 30, and x is from about 40 to about 60, and v is 0.

As shown in connection with structure I above, $\pi$ and $\pi^1$ groups containing arylamine photoconductive groups are appended to a diacid residue or difunctional organic compound residue in the defined photoconductive polymers. Such arylamine groups are attached to the diacid side of the polymer, for example, by basic condensation of an arylamine having an aldehyde substituent with an active methylene of a diacid radical to produce an unsaturated bond joining the photoconductor to the diacid radical. The unsaturated bond is thereafter reduced by hydrogenation over a palladium/charcoal catalyst. Schematically, the preparation of the arylamine-containing group is shown as follows:

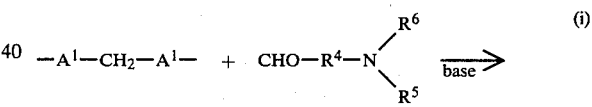

wherein $A^1$, $R^4$, $R^5$ and $R^6$ are defined above.

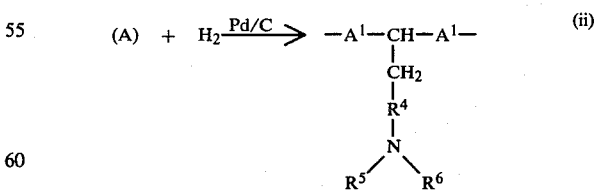

The arylamine photoconductor group is attached to the diacid precursor of the defined polymer followed by polycondensation of the diacid component with the other appropriate condensation polymer components. Alternatively, the arylamine is attached to the diacid component of a preformed polymer. The alternative method is preferred in the event that high molecular weight polymers are desired.

When it is desirable to append the arylamine to a difunctional organic compound, particularly a diol, that is capable of undergoing condensation polymerization with the diacid precursors in the defined polymers, dicarboxcyclic acids containing the pendant arylamine are chemically reduced to yield the corresponding diol. Attachment of the arylamine to organic diamines or hydroxyamines can be carried out by known techniques such as by attaching the arylamine to an organic compound already having the amine or hydroxyamine function- ality. Alternatively, an arylamine can be treated to form the diamine or hydroxyamine functionality.

The polymers described herein, with or without pre-attached arylamine photoconductive groups, are prepared by procedures will known in the art for making linear condensation polymers, particularly interfacial, solution or ester interchange procedures, the latter being preferred for polyesters. Reaction times are governed by the inherent viscosity desired for the resulting polymer. For purposes of illustration, examplary procedures for the preparation of polyesters (Structure IX) are described hereinafter.

When employing interfacial procedures, polymerization is carried out in suitable halogenated solvents, such as methylene chloride, chloroform, dichloroethane, or propylene dichloride. Reaction temperatures are governed by maintenance of a practical rate of reaction and the boiling point of the solvent, with a range of 10° to 40° C. being suitable.

Solution polymerization procedures can be carried out by condensing suitable acid halides, such as terephthaloyl, isophthaloyl, or cyclohexanedicarboxylic acid chlorides, with the desired diols in a suitable solvent, in the presence of a suitable acid acceptor, such as pyridine, triethylamine, or tripropylamine. The acid acceptor can be employed in excess to serve as the solvent.

A preferred mode of preparing the polyesters disclosed herein is the ester interchange procedure either by melt or powder process, and preferably by the melt process. The diols and the carboxylates are heated to a melt on an approximately equal molar basis and treated with a transesterification catalyst such as alkali or alkaline earth metal carbonates, oxides, hydroxides, hydrides, and alkoxides; or compounds of a Group IVB metal of the Periodic Table, such as tetraisopropylorthotitanate, butyl titanate, organo-metallic halides, and complex alkoxides such as $NaHTi(OCH_9)_2$. As a practical matter, it is frequently desirable to utilize an excess of up to about 80 molar percent of the diol component in the reaction mixture. Low boiling alcohols are removed by distillation during polymerization.

The condensation polymers described herein exhibit an inherent viscosity of from about 0.10 to about 0.50 and preferably from 0.1 to 0.4 as measured at 25° C. at a concentration of 0.25 g/deciliter in a 1:1 mixture of phenol and chlorobenzene.

The polymers described herein have a glass transition temperature within the range of about 30° C. to about 90° C. as determined by differential scanning colorimetry as disclosed in "Techniques and Methods of Polymer Evaluation", Vol. 2, Marcel Dekker, Inc., N.Y., 1970.

The structures of representative photoconductive polyesters containing appended arylamine photoconductors as described herein are shown in Table I below (mole percentages set forth by parenthesis indicate a separate polymer of the structure shown):

TABLE I

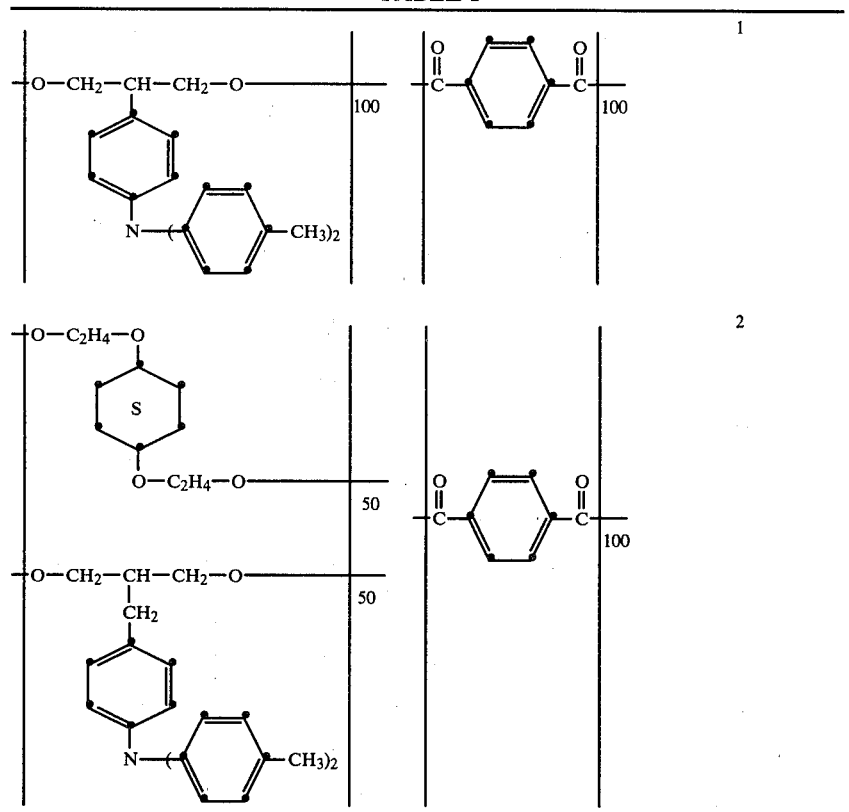

TABLE I-continued
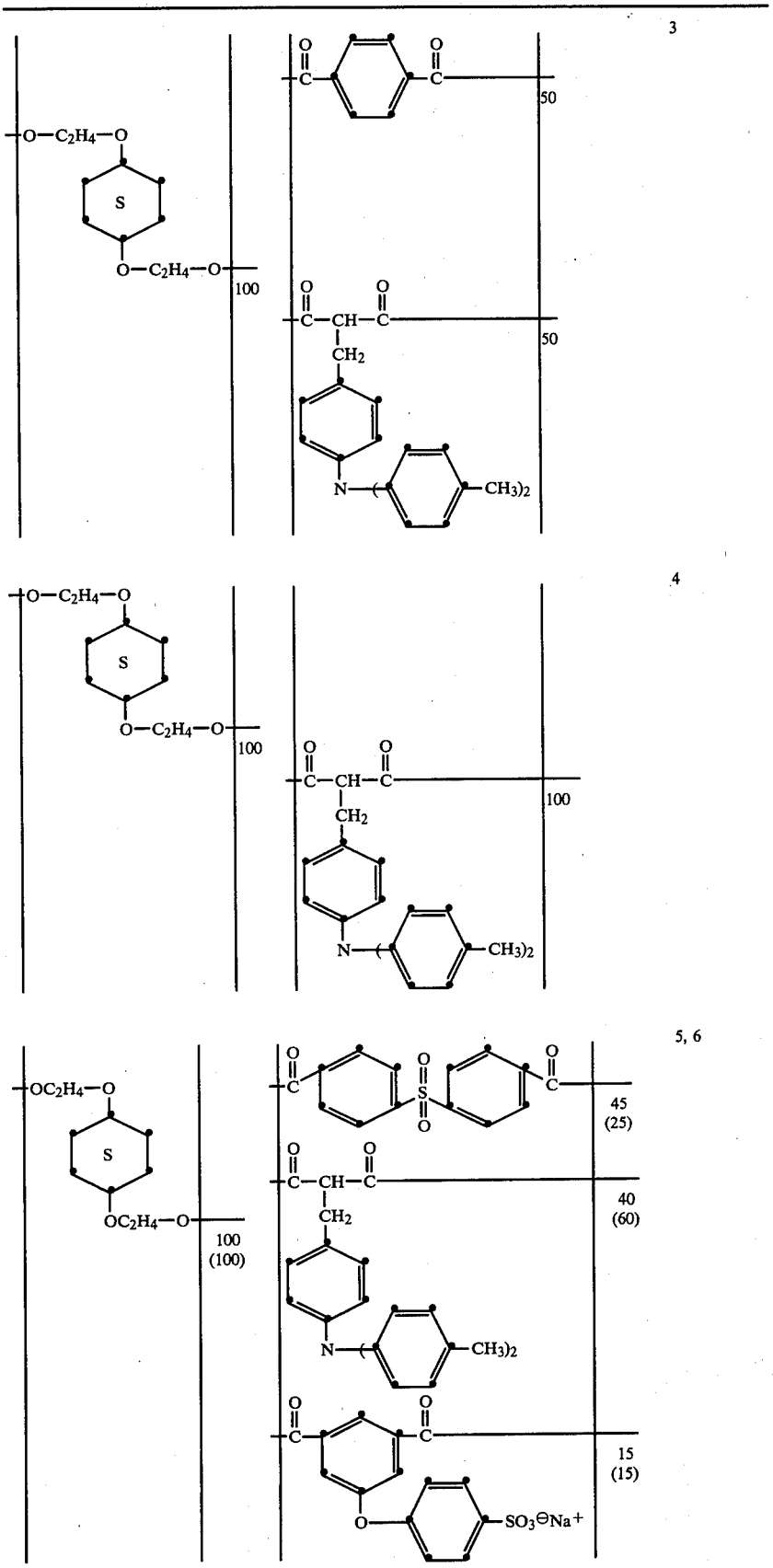

TABLE I-continued
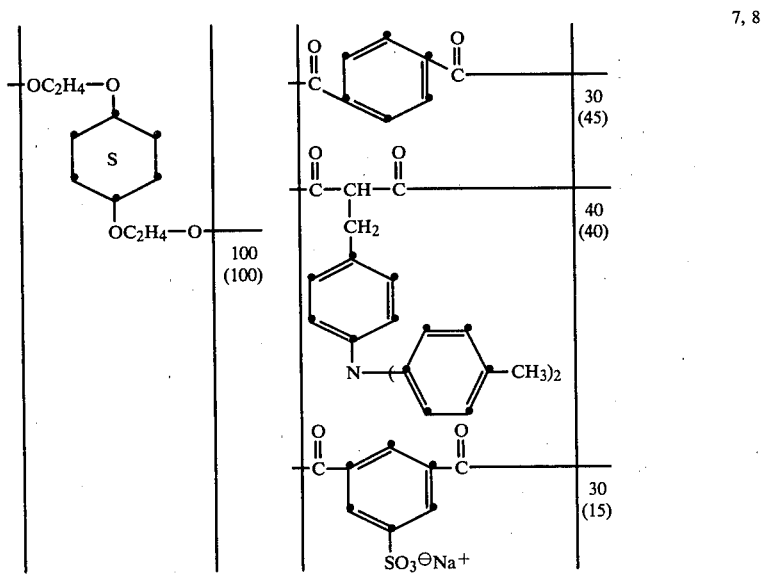
7, 8
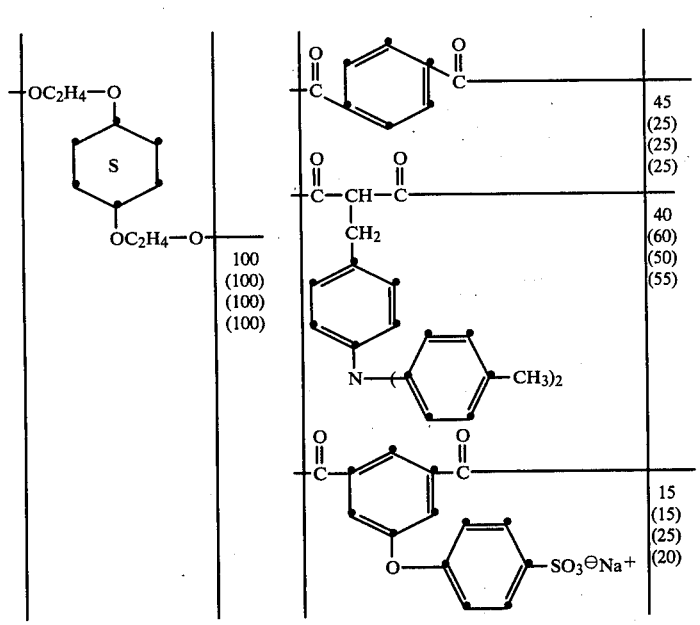
9, 10, 11, 12

TABLE I-continued
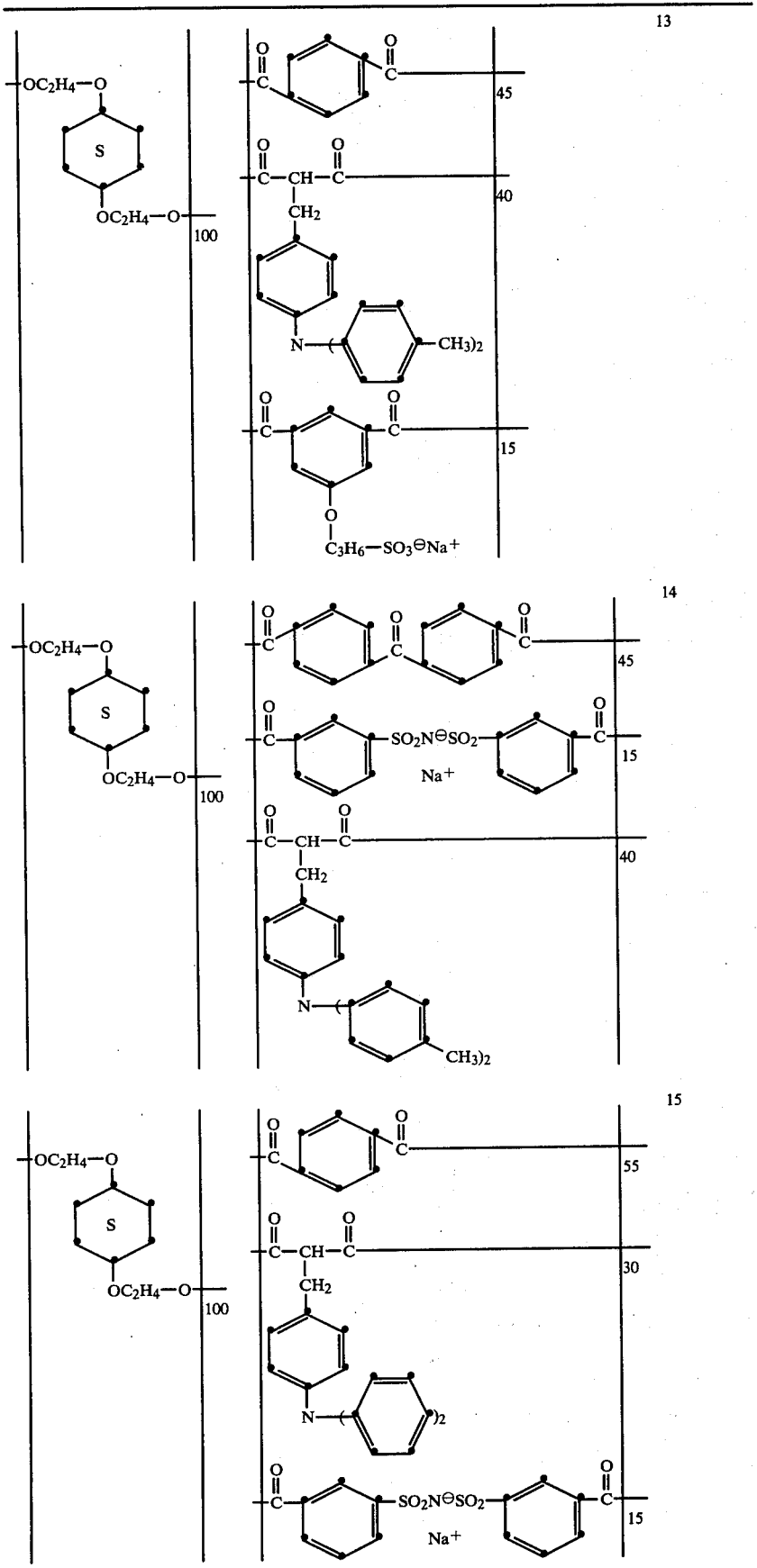

TABLE I-continued
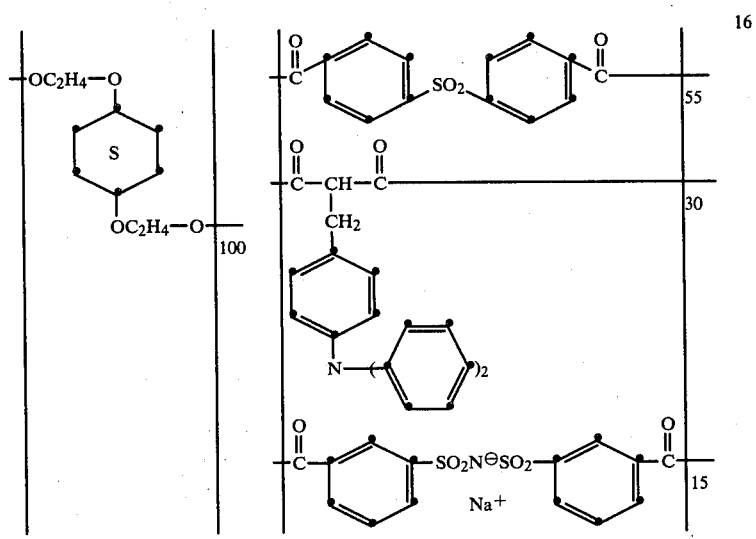
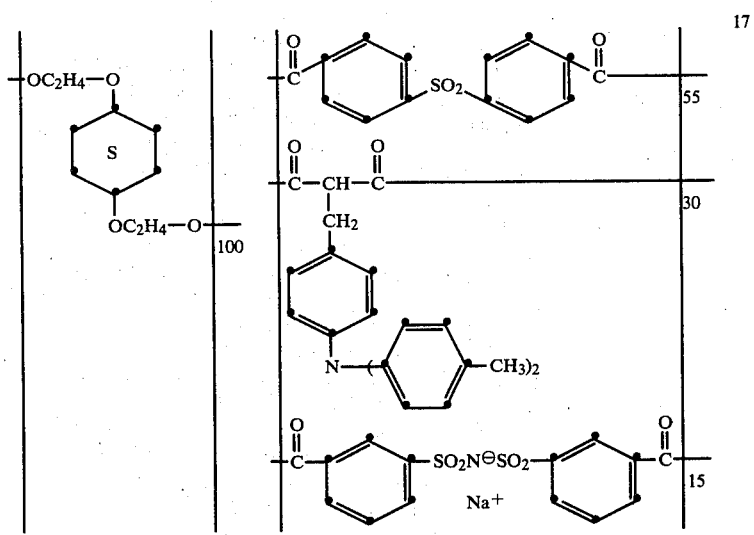

TABLE I-continued

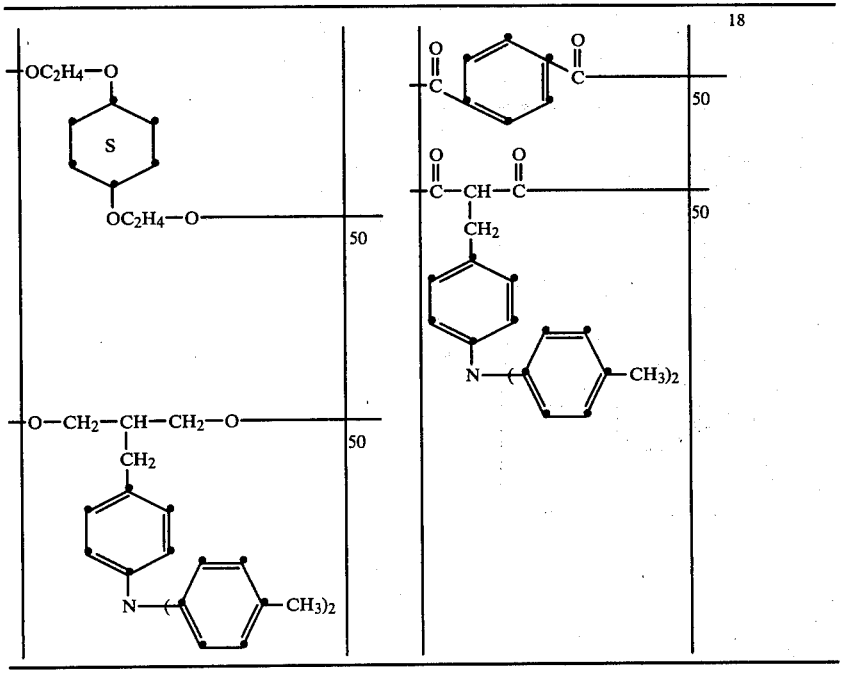

The utility of the present polymeric photoconductors extends generally to those areas in which a photoconductive component is desirable such as in electrophotography. In electrophotography, compositions comprising the polymeric photoconductors are applied as layers to electroconducting supports to form electrophotographic elements. Alternatively, layers containing the present polymeric photoconductors can be employed to form multilayer electrophotographic elements with or without additional layers containing other photoconductors. In such multilayer elements—often referred to as multiactive elements—one photoconductor layer functions as a charge generation layer while a second photoconductor layer functions as a transport layer for the generated charge. The present polymeric photoconductors are useful in such charge generation or charge transport layers.

The polymeric photoconductive materials of the invention are employed in photoconductive compositions and layers with or without a separate binder and with or without sensitizing addenda and/or additional optional photoconductors. Generally, because of the film-forming properties of a polymeric material, a binder is not required. In such case, the photoconductor is dissolved or dispersed in a suitable solvent and coated on a support to form a self-supporting film layer.

Solvents of choice for preparing coating compositions of the present invention include organic solvents such as benzene, toluene, acetone, 2-butanone, chlorinated hydrocarbons such as methylene chloride and ethylene chloride, ethers such as tetrahydrofuran or mixtures of these solvents. In those instances where water-dispersible ionic polymeric photoconductors are employed, water is employed as solvent to form an aqueous coating composition.

In preparing the coating composition useful results are obtained where the photoconductor substance is present in an amount equal to at least about 1 weight percent of the coating composition (on a solvent-free basis). The upper limit in the amount of photoconductor substance present is not critical. As indicated previously, the polymeric materials of the present invention do not require a separate binder in order to obtain a self-supporting coating on the support. In those cases where a separate binder is employed, it is normally desirable that the photoconductor substance be present in an amount of from about 1 weight percent of the coating composition to about 99 weight percent of the coating composition. A preferred weight range for the photoconductor substance in the coating composition is from about 10 weight percent to about 60 weight percent.

Coating thicknesses of the photoconductive composition on a support can vary widely. Normally a dry coating in the range of about 0.5 micron to about 30 microns is useful for the invention.

Suitable supporting materials for electrophotographic elements of the invention include electrically conducting supports such as paper or conventional film supports, for example, cellulose acetate, cellulose nitrate, polystyrene, poly(ethylene terephthalate), poly(vinyl acetal), polycarbonate and related films having a conductive layer thereon. A useful conducting support is prepared by coating a transparent film support material with a layer containing a semiconductor such as cuprous iodide dispersed in a resin. Suitable conducting coatings are also prepared from the sodium salt of a carboxyester lactone of maleic anhydride-vinyl acetate copolymer. Such conducting layers and methods for their optimum preparation and use are disclosed in Minsk U.S. Pat. No. 3,007,901 issued Nov. 7, 1961; Trevoy U.S. Pat. No. 3,245,833 issued Apr. 12, 1966; Sterman et al U.S. Pat. No. 3,262,807 issued July 26, 1966; etc. Additional useful conductive layers include carbon-containing layers such as conductive carbon particles dispersed in a resin binder. Metal coated papers; metal-paper laminates; metal foils such as aluminum foil; metal plates such as aluminum, copper, zinc, brass and galvanized plates; as well as vapor deposited metal layers such as silver, nickel or aluminum deposited on conventional film supports are also useful as are conductive or conductor-coated glasses.

Sensitizing compounds, if desired for use with the photoconductive elements of the present invention, are selected from a wide variety of materials known in the art as sensitizers for organic photoconductors. Especially preferred sensitizers are pyrylium dye salts including thiapyrylium dye salts and selenapyrylium dye salts disclosed in VanAllan et al U.S. Pat. No. 3,250,615. Useful other materials include the spectral sensitizers in any one of U.S. Pat. Nos. 3,705,913; 3,615,416; 3,589,897; 3,958,991; 3,796,573 and 3,597,196, as well as boron diketonate dyes as disclosed in Daniel et al U.S. Pat. No. 3,567,439.

The amount of sensitizer that is added to a photoconductive composition of the invention to give effective increases in speed varies widely. The optimum concentration will vary with the specific photoconductor and sensitizing compound used. In general, substantial speed gains are obtained where an appropriate sensitizer is added in a concentration range from about 0.0001 to about 10 weight percent or more based on the weight of the coating composition. Normally, sensitizers are added to the coating composition in an amount of 0.005 to about 5.0 weight percent of the total coating composition.

A presently preferred electrophotographic element employing the polymeric photoconductors according to the invention comprises a paper support having an electroconducting polymeric layer on each side of the paper support. A brightening layer composed to TiO₂ is coated on one of the electroconducting polymeric layers and a photoconductive layer comprising a water-dispersible ionic polymeric photoconductor as described herein coated from an aqueous coating composition over the TiO₂ containing layer.

The following procedures and examples are provided to illustrate the preparation and utility of polymeric photoconductors of the present invention.

Polymerization Procedure

All of the polymers described in Table I can be synthesized by the standard high temperature melt condensation procedure described below. Polyesters are described for purposes of illustration.

A polymerization flask was charged with the appropriate diols and diesters. The flask was equipped with a Vigreaux condenser. The condenser was fitted with a nitrogen inlet tube and gas flushed through the system at 40 ml/min. The flask was immersed in a 235° C. salt bath to just below the stoppered side arm. When the chemical mixture became a homogeneous melt, one drop of tetraisopropyl orthotitanate was added as a catalyst.

The volatiles were distilled at 235° C. and at atmospheric pressure for 4 hrs. The condenser and inlet tube were replaced with a stainless steel stirrer attached so as to be vacuum tight. A vacuum was drawn to about 0.05 mm Hg, the polymer stirred at 200 rpm and the torque applied by the melt to the stirrer measured. When the torque indicated the desired degree of polymerization, the stirring and vacuum were stopped and the polymerization flask removed from the bath as quickly as possible. The polymerization flask was immersed in liquid nitrogen and the flask broken away from the solidified glassy polymer.

Condensation of the Malonate-Containing Polymers with the Arylamines Containing an Aldehyde Substituent This illustrates the attachment of the arylamine photoconductive group to a preformed polyester. The preparation of polyester 16 in Table I is described to exemplify this method. Polyesters 15 and 17 were also prepared by this method with appropriate modification of the reactants set forth below.

A one-liter, three-necked, round-bottom reaction flask equipped with a stirrer, thermometer, and condenser was charged with 27.7 g of polymer 19 below and 300 ml of dry 1,2-dichloroethane.

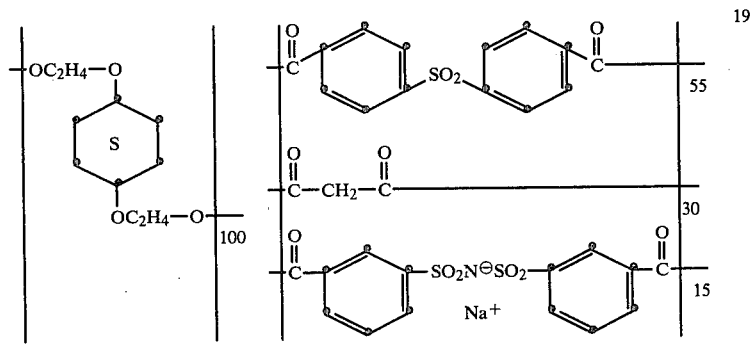

In 50 ml of dry 1,2-dichloroethane was dissolved 5.33 g of diphenylaminobenzaldehyde. The latter solution and 0.1 gm of piperidine were added to the reaction flask. After thorough mixing, 2 g of 4 A molecular sieves were added, and the reaction was stirred for four days. The reaction mixture was filtered and the 1,2-dichloroethane was evaporated leaving a polymeric residue. The residue was extracted with acetonitrile to eliminate unreacted diphenylaminobenzaldehyde. The yield was 18.8 g of polyester 16.

Condensation of Diethyl Malonate with a Triarylamine Containing an Aldehyde Substituent This illustrates the attachment of the triarylamine photoconductive group to a malonate diacid. The resulting malonate-photoconductor diacid was then polymerized as described above with appropriate glycols and other diacids to produce polyesters 5–14 in Table I.

A five-liter, three-necked, round-bottom flask equipped with stirrer, thermometer, Dean Stark trap, and condenser was charged with 391.8 g of di-p-tolylaminobenzaldehyde, 208 g of diethyl malonate, 11 ml of piperidine, 13 ml of acetic acid, and 1500 ml of toluene. The reaction solution was refluxed for 6 hours, and during this time 32 ml of water was collected. The reaction was cooled and the toluene was evaporated. The product was taken up in 900 ml of ethanol, and the ethanol was slowly reduced in volume by evaporation. The crystalline product was collected, and had a melting point of 99°–105° C. The product was recrystallized again from ethanol, dried, and had a melting point of 104°–106° C. The yield was 494 g. The condensation product, diethyl 4-[N,N-di-p-tolylamino]benzylidenemalonate, was reduced using palladium over charcoal as the catalyst.

EXAMPLES 1–3

These examples illustrate the solvent coating of ionic polyesters of the present invention to form photoconductive layers on a conductive film support and the resulting photodischarge characteristics of the photoconductive layers.

The ionic polyester 6 from Table I was dissolved in tetrahydrofuran (THF) at 20% solids. The solution was coated onto 0.4 O.D. (optical density) nickel-coated poly(ethylene terephthalate) support to give a dry coating of approximately 6.5μ thick. Another solution was prepared and coated as above, except 0.5% of the following sensitizer was added:

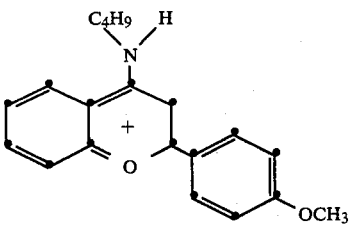

,

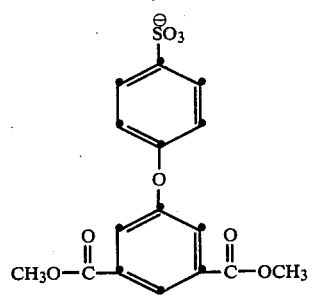

A third solution was prepared and coated as above except polyester 10 replaced polyester 6 to a coating thickness of 7μ, and dichloroethane replaced THF as solvent.

The resulting photoconductive layers were charged to an initial charging potential ($V_o$), exposed to a 350 nm monochromatic light source, and the photodischarge measurements of the layers were determined as the number of ergs/cm² required to dissipate the charge to ½ $V_o$.

The results of the photodischarge measurements are listed in Table II.

TABLE II
Photodischarge Sensitivity of Sensitized Ionic Polyester Photoconductors (Positive Charging-Front Surface Exposure)

| Example | Polymeric film | Charging Potential, $V_o$ (volts) | Photodischarge to ½ $V_o$ at $\lambda$ = 350 nm [ergs/cm²] |
|---|---|---|---|
| 1 | Polyester 6 | +441 | 56 |
| 2 | Polyester 6 + sensitizer | +375 | 33 |
| 3 | Polyester 10 | +500 | 98 |

EXAMPLES 4–8

These examples demonstrate the aqueous coating of ionic polyesters of the present invention to form photoconductive layers on a film support and the resulting electrical properties (positive or negative charging modes) of the photoconductive layers.

Various ionic polyesters from Table I were dispersed in water at 20–25% solids and coated on the nickel coated support described in Examples 1–3 above. The dry coating thickness ranged from 6.5μ to 7μ.

The elements produced were evaluated for saturation potential ($V_{sat}$) and time constants ($\tau$) of dark decay using a Monroe Electrostatic Voltmeter, a strip chart recorder in conjunction with a corona charger, and a rotatable metal cylinder on which the sample was mounted. Continuous charging (positive and negative) of the sample was carried out until the voltmeter indicated no further increase in surface potential. The charger was then shut off, and the output of the voltmeter recorded as it indicated the dark decay of the surface potential of the sample. Dark decay was recorded until the potential had decreased to ⅓ of $V_{sat}$, defining the time constant of decay, $\tau$.

The results of these measurements are shown in Table III below.

TABLE III
Dark Decay and Dark Decay Porperties Of Ionic Polyester Photoconductor Films

| Example | Polymer | RH | $V_{sat}$ (volts) | $\tau$ (sec.) | ($V_{sat}$ → ⅓ $V_{sat}$) |
|---|---|---|---|---|---|
| 4 | 9 | 50% | +560 | | +280 |
| | | | −560 | | −280 |
| 5 | 13 | 50% | +440 | | +175 |
| | | | −440 | | −175 |
| 6 | 8 | 50% | +450 | | +260 |
| | | | −450 | | −260 |
| 7 | 11[a] | 35% | +620 | | +900 |
| | | | −580 | | −900 |
| 8 | 12[a] | 35% | +820 | | +900 |
| | | | −800 | | −900 |

[a]Films dark adapted for 24 hours prior to charging.

EXAMPLES 9–13

These examples illustrate electrophotographic elements composed of conducting paper supports coated with aqueous dispersions containing an ionic polyester of the present invention. The electrical properties and photodischarge characteristics of the resulting elements are also set forth.

Polyester 12 from Table I was combined with 70° C. water at 20% solids, and dispersed with a paddle stirrer. To the aqueous dispersion was added 0.5 wt/% of the following water-soluble sensitizer:

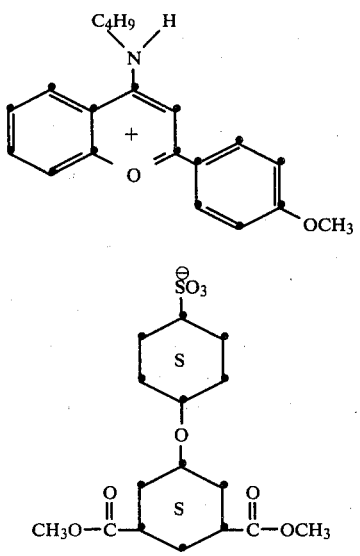

The aqueous dispersion was machine coated onto a conductive paper support. This support comprised a TiO2 coated paper substrate coated on the back side with a conductive layer of a dispersed clay including a conductive clay (Bentonite ® Clay, an aluminum silicate) dispersed in a poly(styrene-cobutadiene) latex. The coatings were made to produce a range of polymer coverages. The electrical properties of these photoconductive paper coatings are listed in Table IV.

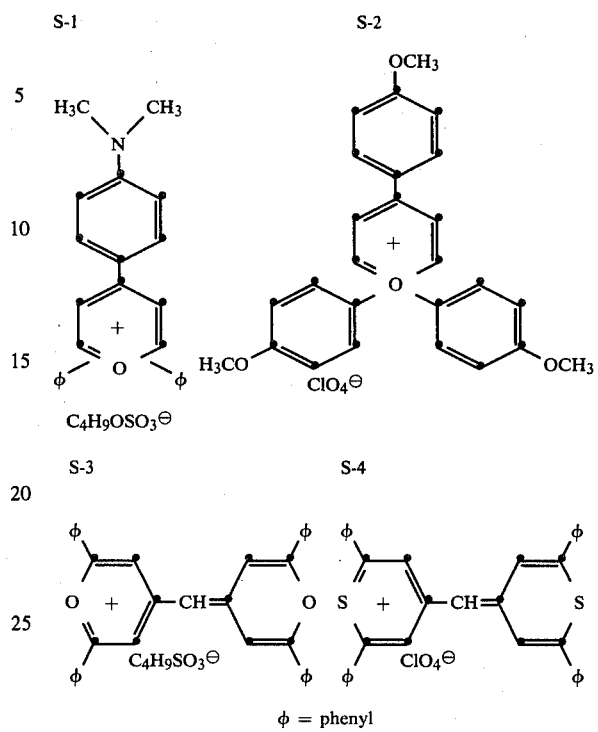

$\phi$ = phenyl

The photodischarge characteristics in ergs/cm² of the prepared layers was determined for various wavelengths of light in the visible portion of the spectrum.

TABLE IV

Dark Charging, Dark Decay and Photosensitivity of Ionic Polyester Photoconductor Coated Papers

| Example | Dry Coverage g/m² | Thickness (microns) | $V_{sat}$ (volts) + | $V_{sat}$ (volts) − | $\tau$ (sec) + | $\tau$ (sec) − | ($V_{sat} \rightarrow \frac{1}{2} V_{sat}$) RH (%) | Photodischarge (+500 Volts to 250 volts) at $\lambda$ = 350 nm |
|---|---|---|---|---|---|---|---|---|
| 9 | 12.5 | 14.8 | >1000 | >1000 | >1200 | >1200 | 55 | 94 ergs/cm2 |
| 10 | 15.0 | 11.0 | 780 | 860 | >1200 | >1200 | 55 | 88 ergs/cm2 |
| 11 | 17.0 | 13.2 | 750 | 840 | >1200 | >1200 | 55 | — |
| 12 | 19.0 | 17.0 | >1000 | 920 | >1200 | >1200 | 55 | — |
| 13 | 10.0 | 9.0 | >1000 | >1000 | >1200 | >1200 | 55 | 78 ergs/cm2 |

EXAMPLES 14–17

These examples illustrate spectral sensitization of ionic polymeric photoconductors of the present invention into the visible region of the spectrum using appropriate spectral sensitizing dyes.

To separate solutions of the polyester 12 dissolved in dichloromethane (10% by weight, polyester) the following spectral sensitizing dyes were added at a concentration of 2%, by weight. The resulting solutions were coated on 0.4 O.D. nickel coated poly(ethylene terephthalate) supports, and dried 16 hours at 60° C.

Results are shown in Table V

TABLE V

Photosensitivity of Visibly Sensitized Ionic Polyester Photoconductors

| Example | Dry Layer Thickness μ | Sensitizing Dye | Charging Potential (Vo) | Photo discharge Vo→ ½ Vo (ergs/cm²) | Wave length (nm) |
|---|---|---|---|---|---|
| 14 | 10 | S-1 | +425 | 131 | 546 |
|  |  |  | +754 | 131 | 546 |
|  |  |  | −233 | 626 | 546 |
|  |  |  | −292 | 583 | 546 |
| 15 | 10 | S-2 | +483 | 92 | 430 |
|  |  |  | +625 | 95 | 430 |
|  |  |  | +650 | 84 | 430 |
|  |  |  | −183 | 178 | 430 |
|  |  |  | −258 | 167 | 430 |
|  |  |  | −375 | 130 | 430 |
| 16 | 8 | S-3 | +483 | 59 | 565 |
|  |  |  | +600 | 68 | 565 |
|  |  |  | +621 | 73 | 565 |
|  |  |  | −242 | 215 | 565 |
|  |  |  | −525 | 137 | 565 |
| 17 | 9 | S-4 | +408 | 418 | 642 |
|  |  |  | −433 | 1009 | 642 |
|  |  |  | −542 | 735 | 642 |

TABLE V-continued

Photosensitivity of Visibly Sensitized Ionic Polyester Photoconductors

| Example | Dry Layer Thickness μ | Sensitizing Dye | Charging Potential (Vo) | Photo discharge Vo→ ½ Vo (ergs/cm²) | Wave length (nm) |
|---|---|---|---|---|---|
| | | | −642 | 649 | 642 |

EXAMPLE 18

This exemplifies the use of the element described in Example 9 above in a copy process to produce a toned visible image.

An electrophotographic copying device was assembled containing a grid-controlled corona charger, a vacuum platten to accept a 70 mm wide strip, an insulative glass with an attached negative test target, a tungsten lamp controlled by a timer, and an immersion liquid toner station. The element from Example 13 was charged to +500 volts, exposed for five seconds and then developed for one second using Recordak ® 12N Negative Liquid Toner (available from Eastman Kodak Company, Rochester, N.Y.). The element was also charged to +300 volts, and then exposed, and developed as above. Very sharp, well-resolved images were obtained in both cases.

The invention has been described in detail with particular reference to preferred embodiments thereof, but it will be understood that variations and modifications can be effected within the spirit and scope of the invention.

What is claimed is:

1. An electrophotographic element comprising an electrically conducting support and a photoconductive layer in electrical contact with said support, said photoconductive layer comprising a condensation polymer containing, as repeating units, the condensation residues of:
   (a) a diacid, and
   (b) an organic difunctional compound capable of undergoing condensation polymerization with said diacid,
wherein at least one of said residues contains an appended arylamine photoconductor group.

2. An electrophotographic element comprising an electrically conducting support and a photoconductive layer in electrical contact with said support, said photoconductive layer comprising a condensation polymer containing, as repeating units, the condensation residues of:
   (a) a first diacid,
   (b) a second diacid containing an anionic iminodisulfonyl or sulfo group, and
   (c) at least one organic difunctional compound capable of undergoing condensation polymerization with said first and second diacids,
wherein at least one of said first diacid and organic difunctional compound residues contains said appended arylamine photoconductor group.

3. The element of claim 2 wherein said support is an electrically conducting paper support.

4. An electrophotographic element comprising an electrically conducting support and a photoconductive layer in electrical contact with said support, said photoconductive layer comprising a spectral sensitizer and a polymeric photoconductor having the structure

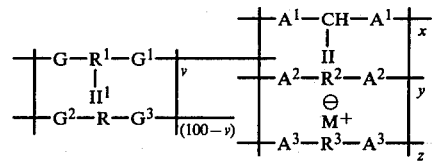

wherein $\pi$ and $\pi^1$, which are the same or different, are organic groups containing an arylamine which confers photoconductivity upon the polymer; $R^1$-$\pi^1$ together with G and $G^1$ represents an arylamine-containing organic condensation residue of a difunctional compound capable of undergoing condensation with organic diacids; R together with $G^2$ and $G^3$ represents at least one organic condensation residue of a difunctional compound capable of undergoing condensation with organic diacids; G and $G^1$, which are the same or different, and $G^2$ and $G^3$, which are the same or different, represent -O- or -NH-; $A^1$, $A^2$ and $A^3$, which are the same or different, represent the condensation residues of acid groups; $R^{2\ominus}$ is an organic group which contains an anionic iminodisulfonyl or sulfo group; $M^+$ is a cation; -$A^3$-$R^3$-$A^3$ represents an organic diacid condensation residue; x is 0 to 100 mole percent of the total diacid content; y is 0 to about 35 mole percent of the total diacid content; z is 0 to 100 mole percent of the total diacid content; the sum of x, y and z is 100; v is 0 to 100 mole percent of the total difunctional compound content; and v+x is at least 20.

5. The element of claim 4 wherein $\pi$ and $\pi\text{HU }1$ have the structure $$\begin{array}{c} | \\ (CH_2)_u \\ | \\ R^4 \\ | \\ N \\ R^5 \diagup \diagdown R^6 \end{array}$$

wherein u is an integer from 1 to 6; $R^5$ and $R^6$ are the same or different and represent alkyl, cycloalkyl, aryl or aralkyl; $R^4$ is alkylene, cycloalkylene, arylene or arylenealkylene; at least one of $R^4$, $R^5$ and $R^6$ comprises an aromatic group appended to the nitrogen atom; $R^3$ is an alkylene, arylene, arylenealkylene, cycloalkylene, heterocyclic or an ethylenically unsaturated group; and $A^1$, $A^2$ and $A^3$ are $$-\overset{O}{\underset{\|}{C}}- \quad \text{or} \quad -\overset{O}{\underset{\underset{\|}{O}}{S}}-,$$

and said spectral sensitizer is a pyrylium dye salt.

6. The element of claim 5 wherein $R^4$ is phenylene, $R^5$ and $R^6$ are each phenyl or tolyl, u is 1, v is 0 and $R^2$ is selected from the group consisting of

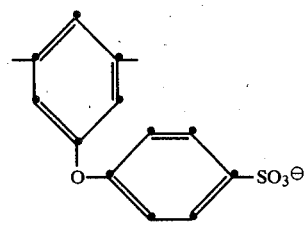

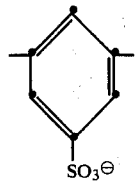

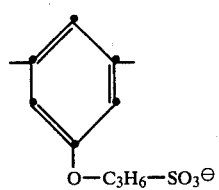

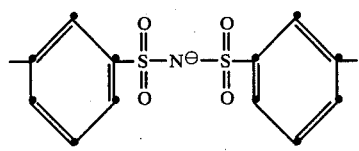

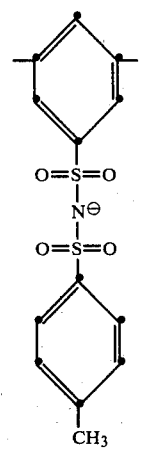

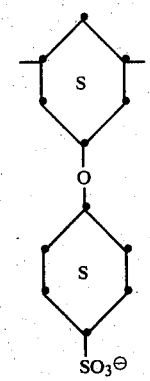

-continued

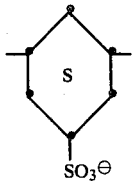

7. An electrophotographic element comprising an electrically conducting support and a photoconductive layer in electrical contact with said support, said photoconductive layer comprising a polyester containing, as repeating units, the condensation residues of:
(a) a dicarboxylic acid, and
(b) an organic diol capable of undergoing condensation polymerization with said dicarboxylic acid,
wherein at least one of said residues contains an appended arylamine photoconductive group.

8. An electrophotographic element comprising an electrically conducting support and a photoconductive layer in electrical contact with said support, said photoconductive layer comprising an ionic polyester containing, as repeating units, the condensation residues of:
(a) a first dicarboxylic acid,
(b) a second dicarboxylic acid containing an anionic iminodisulfonyl or sulfo group, and
(c) at least one organic diol capable of undergoing condensation polymerization with said first and second dicarboxylic acids,
wherein at least one of said first dicarboxylic acid and organic diol residues contains an appended arylamine photoconductor group.

9. An electrophotographic element comprising an electrically conducting support and a photoconductive layer in electrical contact with said support, said photoconductive layer comprising a spectral sensitizer and a polymeric photoconductor having the structure

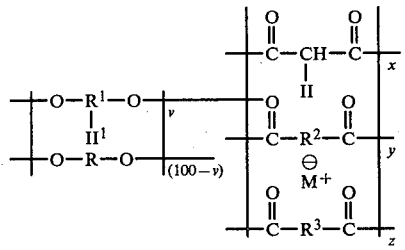

wherein $\pi$ and $\pi^1$, which are the same or different, are organic groups containing an arylamine which confers photoconductivity upon the polymer;

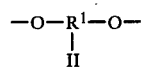

is the condensation residue of an arylamine-containing organic diol having from about to 2 about 40 carbon atoms; -O-R-O- is the condensation residue of at least one organic diol having from about 2 to about 40 carbon atoms; $R^{2\ominus}$ is an organic group which contains an anionic iminodisulfonyl or sulfo group; $M^+$ is a cation;

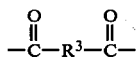

represents an organic dicarboxylic acid condensation residue; x is 0 to 100 mole percent of the total dicarboxylic acid content; y is 0 to about 35 mole percent of the total dicarboxylic acid content; z is 0 to 100 mole percent of the total dicarboxylic acid content; the sum of x, y and z is 100; v is 0 to 100 mole percent of the total diol content; and v+x is at least 20.

10. The element of claim 9 wherein $\pi$ and $\pi^1$ have the structure

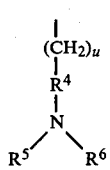

wherein u is an integer from 1 to 6; $R^5$ and $R^6$ are the same or different and represent alkyl, cycloalkyl, aryl or aralkyl; $R^4$ is alkylene, cycloalkylene, arylene or arylenealkylene; at least one of $R^4$, $R^5$ and $R^6$ comprises an aromatic group appended to the nitrogen atom; $R^3$ is an alkylene, arylene, arylenealkylene, cycloalkylene, heterocyclic or an ethylenically unsaturated group and said spectral sensitizer is a pyrylium dye salt.

11. The element of claim 10 wherein said support is an electrically conducting paper support, and, in said polymer, $R^4$ is phenylene, $R^5$ and $R^6$ are each phenyl or tolyl, u is 1, v is 0, x is from about 40 to about 60 mole percent, y is from 10 to about 30 mole percent, and $R^2$ is selected from the group consisting of

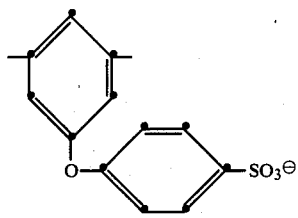

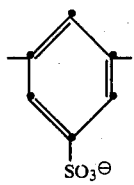

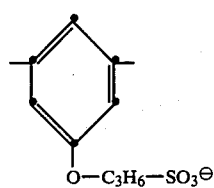

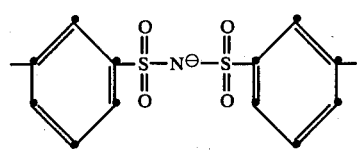

or,

-continued

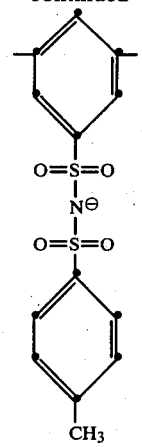

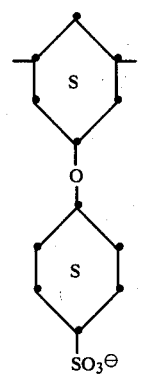

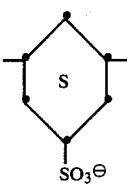

12. The element of claim 10 wherein the repeating unit

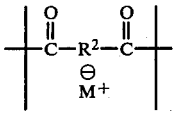

is the condensation residue of a dicarboxylic acid selected from the group consisting of 3,3'-[(sodioimino)-disulfonyl]dibenzoic acid; 3,3'-[(potassioimino)disulfonyl]dibenzoic acid; 3,3'-[(lithioimino)disulfonyl]-dibenzoic acid; 4,4'-[(lithioimino)disulfonyl]dibenzoic acid; 4,4'-[(sodioimino)disulfonyl]dibenzoic acid; 4,4'-[(potassioimino)disulfonyl]dibenzoic acid; 3,4'-[(lithioimino)disulfonyl]dibenzoic acid; 3,4'-[(sodioimino)-disulfonyl]dibenzoic acid; 4,4'[(potassiomino)disulfonyl]dinaphthoic acid; 5-[N-potassio-N-(4-tolylsulfonyl)sulfamoyl]isophthalic acid 5-sodiosulfoisophthalic acid, 5-(4-sodiosulfophenoxy)isophthalic acid, 5-(3-sodiosulfopropoxy)isophthalic acid, and 5-(4-sodiosulfocyclohexyloxy)-1,3-cyclohexanedicarboxylic acid.

13. A copy process for forming visible images on an electrophotographic element as in claim 1, 3, 4, 6, 7, 8, 9 or 11, said process comprising the steps of electrically charging the surface of said photoconductive layer of said element, exposing said charged surface to actinic radiation to form an electrostatic latent image, and developing said latent image to form a visible image.

* * * * *